(12) United States Patent
Stupar

(10) Patent No.: US 6,862,637 B1  
(45) Date of Patent: Mar. 1, 2005

(54) METHOD AND SYSTEM FOR LOCATING DEVICES OVER A SERIAL BUS

(75) Inventor: Wes Stupar, Thousand Oaks, CA (US)

(73) Assignee: Iqstor Networks, Newbury Park, CA (US)

( * ) Notice: Subject to any disclaimer, the term of this patent is extended or adjusted under 35 U.S.C. 154(b) by 424 days.

(21) Appl. No.: 10/159,502

(22) Filed: May 31, 2002

Related U.S. Application Data

(60) Provisional application No. 60/368,663, filed on Mar. 30, 2002.

(51) Int. Cl.⁷ .......................... G06F 13/00; G06F 1/26; G06F 15/16
(52) U.S. Cl. ........................ 710/104; 710/300; 713/300; 709/227
(58) Field of Search ............................... 710/300–304, 710/104; 709/226–228; 713/300, 324, 340

(56) References Cited

U.S. PATENT DOCUMENTS

| | | | | |
|---|---|---|---|---|
| 5,471,634 A | * | 11/1995 | Giorgio et al. | 707/104.1 |
| 5,652,839 A | * | 7/1997 | Giorgio et al. | 709/224 |
| 5,781,798 A | * | 7/1998 | Beatty et al. | 710/10 |
| 6,134,616 A | * | 10/2000 | Beatty | 710/104 |

* cited by examiner

*Primary Examiner*—Tim Vo  
(74) *Attorney, Agent, or Firm*—Tejinder Singh, Klein O'Neill & Singh, LLP

(57) ABSTRACT

A method and system for determining the location of plural devices operationally coupled to a computer system using a 1-Wire bus is provided. The method includes, determining if more than one bus-coupler is detected by the computer system; disconnecting bus-couplers in an arbitrary manner until a pre-determined number of bus-coupler(s) is visible to the computing system; determining the location of the detected pre-determined number of bus-couplers; storing the location of the detected pre-determined number of bus-couplers; and repeating the foregoing steps until all the bus-coupler locations are determined and stored. The pre-determined number of bus-couplers may be one and the plural devices include switches and analog/digital converters.

16 Claims, 4 Drawing Sheets

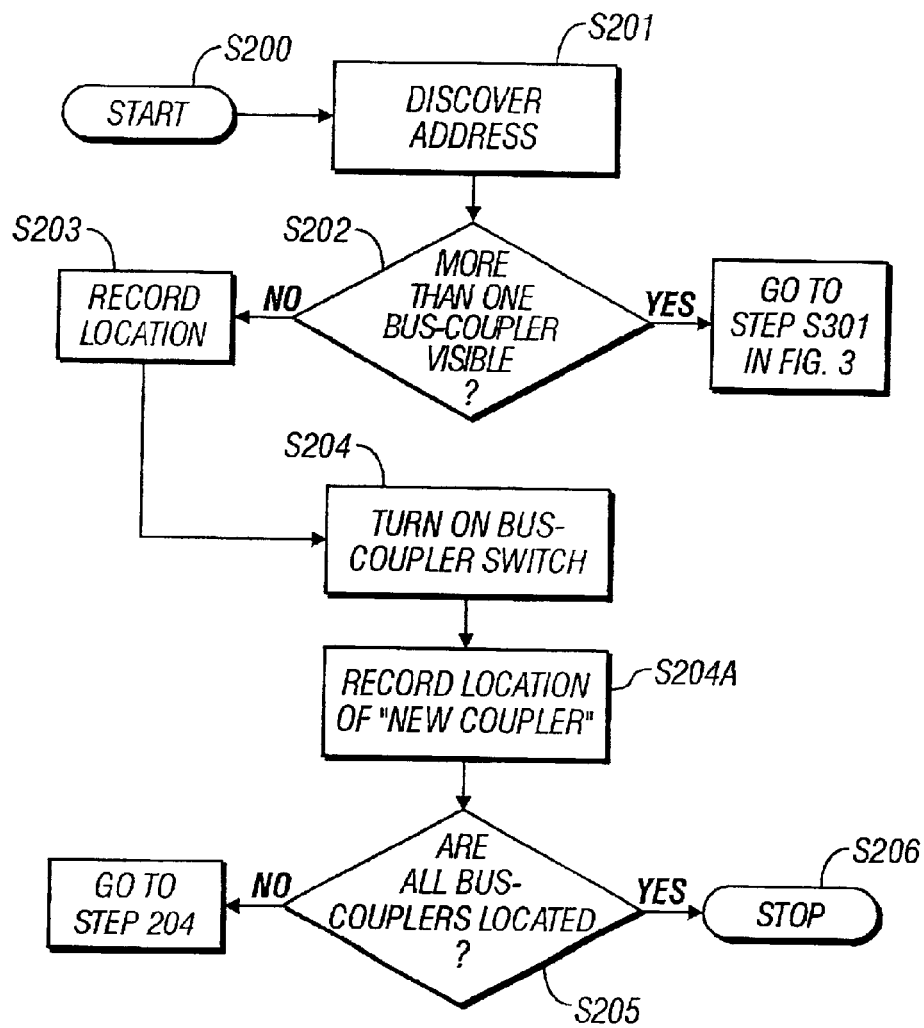
FIG. 2A
FIG. 2B
| POSITION | COUPLER ADDRESS |
|---|---|
| 1 (CLOSEST TO COMPUTER) | ADDRESS OF C1 109 |
| | |
| | |
FIG. 2C

METHOD AND SYSTEM FOR LOCATING DEVICES OVER A SERIAL BUS

CROSS REFERENCE TO RELATED APPLICATIONS

The provisional patent application Ser. No. 60/368,663, titled "METHOD AND SYSTEM FOR LOCATING DEVICES OVER A SERIAL BUS" filed Mar. 30, 2002 is incorporated herein by reference in its entirety.

BACKGROUND OF THE INVENTION

1. Field of the Invention

The present invention relates to devices coupled to a computer, and more particularly, to a method and system for discovering the location of devices coupled to the computer over a serial bus.

2. Background

Maxim-Dallas® provides the 1-Wire serial bus system, under which a signaling scheme is made available for two-way communication between a single master device and plural slave devices. The 1-Wire bus allows various integrated circuit devices, for example, bus-couplers, switches and analog/digital (A/D) converters to be inter-connected.

This allows a computing device (or computer) to access the inter-connected devices.

Typically, every 1-Wire bus compliant device has a unique identification number that identifies the device to the computer. The computer uses a bus-master to access the connected devices. The bus-master ascertains the unique identification number of the connected device using a software driver, and allows the computer to access the device.

One shortcoming of the foregoing discovery system is that although the computer knows the unique address of a connected device, it is not aware of the positional location of the device, as connected to the 1-Wire bus. For example, if various temperature-sensing devices are coupled to a computer using the 1-Wire bus, the computer knows the unique identity of the sensors using the bus-master software driver, but does not know the positional location of the sensors.

One conventional solution to the foregoing problem is to use a programmable read only memory, which stores a location "tag". The tags provide the location of the connected device(s) to the computer. However, this solution is not acceptable because individually "tagging" every device is labor intensive, expensive and prone to error.

Therefore, there is a need for a system and method that will allow a computer to discover the location of devices operationally coupled over the 1-Wire bus.

SUMMARY OF THE INVENTION

In one aspect, the present invention provides a method and system for determining the location of plural devices operationally coupled to a computer system using a 1-Wire bus. The method includes, determining if more than one bus-coupler is detected by the computer system; and disconnecting bus-couplers in an arbitrary manner until a pre-determined number of bus-coupler(s) is visible to the computer system.

Thereafter, determining the location of the detected pre-determined number of bus-couplers; storing the location of the detected pre-determined number of bus-couplers; and repeating the foregoing steps until all the bus-coupler locations are determined and stored. The pre-determined number of bus-couplers may be one and the plural devices include switches and analog/digital converters In one aspect of the present invention, individual tagging is not required to ascertain the location of devices that are operationally coupled to a computer system via a 1-Wire bus.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

FIG. 2A is a flow diagram of computer-executable process steps for discovering the location of devices operationally coupled to a 1-Wire bus, upon on power up, according to one aspect of the present invention.

FIG. 2B is an example of an address format as used for 1-Wire bus devices.

FIG. 2C is an example of an address/location table, according to one aspect of the present invention.

Features appearing in multiple figures with the same reference numeral are the same unless otherwise indicated.

DETAILED DESCRIPTION OF THE PREFERRED EMBODIMENTS

In order to illustrate the various adaptive aspects of the present invention, a brief description of a computing system is provided, followed by a description of the preferred embodiments. It is noteworthy that the components discussed below are not intended to limit the scope of the invention, but to illustrate by way of example, the various aspects of the present invention.

Figure 1A:
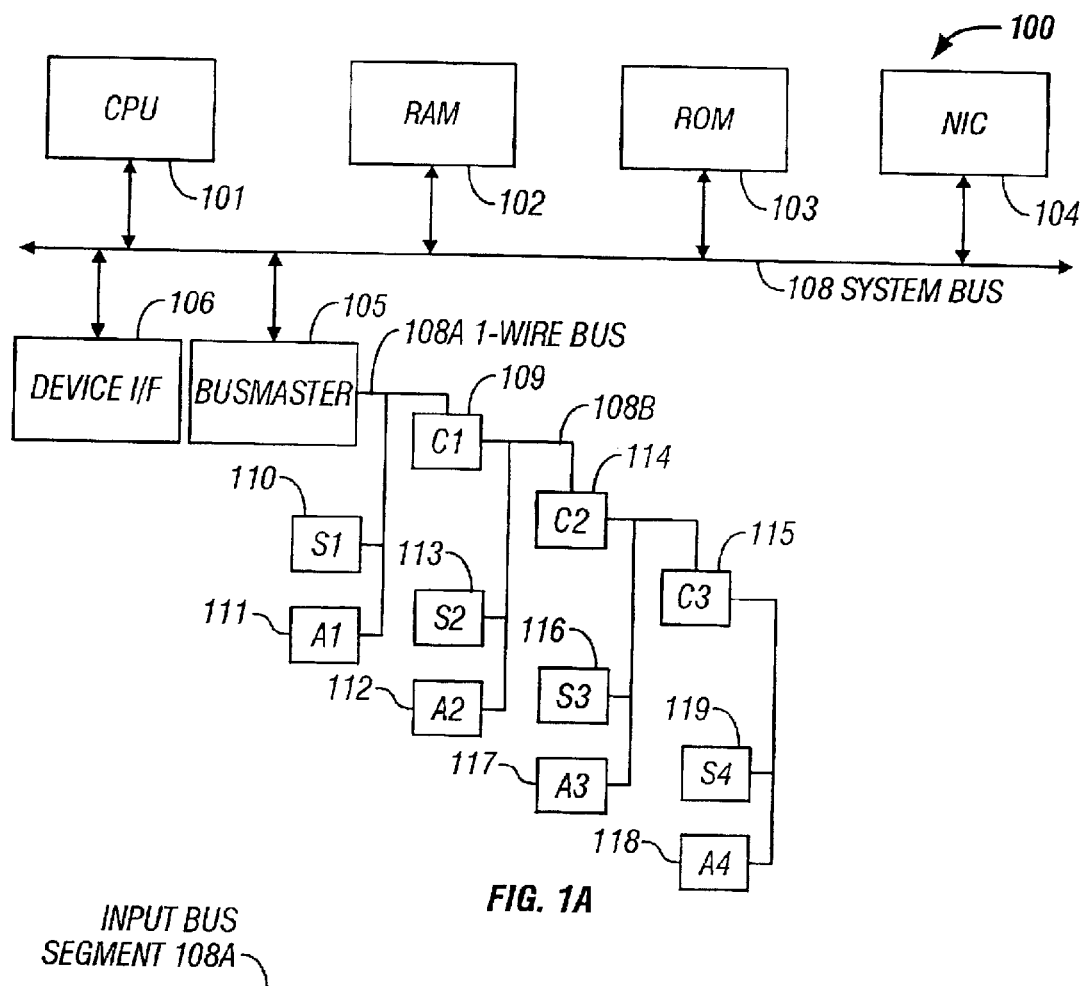
FIG. 1A is a block diagram showing the internal functional architecture of a computer system used to execute computer executable process steps, according to one aspect of the present invention.

FIG. 1A is a block diagram showing the internal functional architecture of computer system 100. Computer system 100 includes a CPU 101 for executing computer-executable process steps and interfaces with a computer bus 108. In one aspect, CPU 101 may be a Pentium (Intel®) class processor, or any other similar processor. In another aspect, CPU 101 may be a micro-controller marketed by Maxim Dallas, Part Number, DS80C390.

Also shown in FIG. 1A is a random access memory ("RAM") 102 that also interfaces to computer bus 108 to provide CPU 101 with access to memory storage. When executing stored computer-executable process steps from a disk or any other media (not shown), CPU 101 stores and executes the process steps out of RAM 102.

Read only memory ("ROM") 103 is provided to store invariant instruction sequences such as start-up instruction sequences or basic input/output operating system (BIOS) sequences.

Network interface ("NIC") module 104 operationally couples computer system 100 to a local area network or any other network(s). Computer system 100 may use "Tiny Internet Interface" ("TINI"), a platform developed by Dallas Semiconductor to connect plural devices, from small sensors to actuators to a computer network.

Device interface 106, allows computer system 100 to connect with various peripheral devices. It is noteworthy, that device interface 106, may include different modules, for example, a pointing device interface (not shown), keyboard interface (not shown) and other modules, allowing computer system 100 to connect to different peripheral devices.

FIG. 1A also shows bus-master 105 that couples computer system 100 to various devices, for example, bus-couplers (C1 109, C2 114 and C3 115), switches (S1 110, S2 113, S3 116 and S4 119) and A/D converters (A1 111, A2 112 and A3 117). Bus-master 105 performs read and write operations to an addressed device on bus 108A. Bus 108A complies with the 1-Wire signaling scheme that performs a two-way communication between a single master and peripheral devices over a single connection.

The devices (bus-couplers, switches and A/D converters) provide input and/or output functions. Bus-couplers can segment bus 108A based on a command and hence isolate the coupled devices with respect to computer system 100.

In one aspect, the bus-couplers (C1 109, C2 114 and C3 115), marketed by Maxim-Dallas, Part Number, DS2409, may be used to implement the executable process steps, according to one aspect of the present invention.

In one aspect, switches (S1 110, S2 113, S3 116 and S4 119) marketed by Maxim-Dallas, Part Number, DS2406 may be used to implement the executable process steps, according to one aspect of the present invention.

In one aspect, A/D converters (A1 111, A2 112, A3 117 and A4 118) marketed by Maxim-Dallas, Part Number, DS2438 may be used to implement the executable process steps, according to one aspect of the present invention.

Various network topologies may be used with computer system 100 and bus 108A, for example, a linear topology may be used under which bus 108A is a single pair and extends to the farthest slave device. A stubbed topology may be used where bus 108A is the single main line and other devices are attached to the main line. A star topology may be used where bus 108A is split at or near the master end, and extends in multiple branches.

Typically, CPU 101 loads a discovery software driver (not shown) from RAM 102 or ROM 103, which allows bus-master 105 to discover the unique address of each connected device by using a binary algorithm. The software driver uses the commands "Find First Device" and "Find Next Device" to obtain the unique device address (but not the positional location).

Figure 1B:
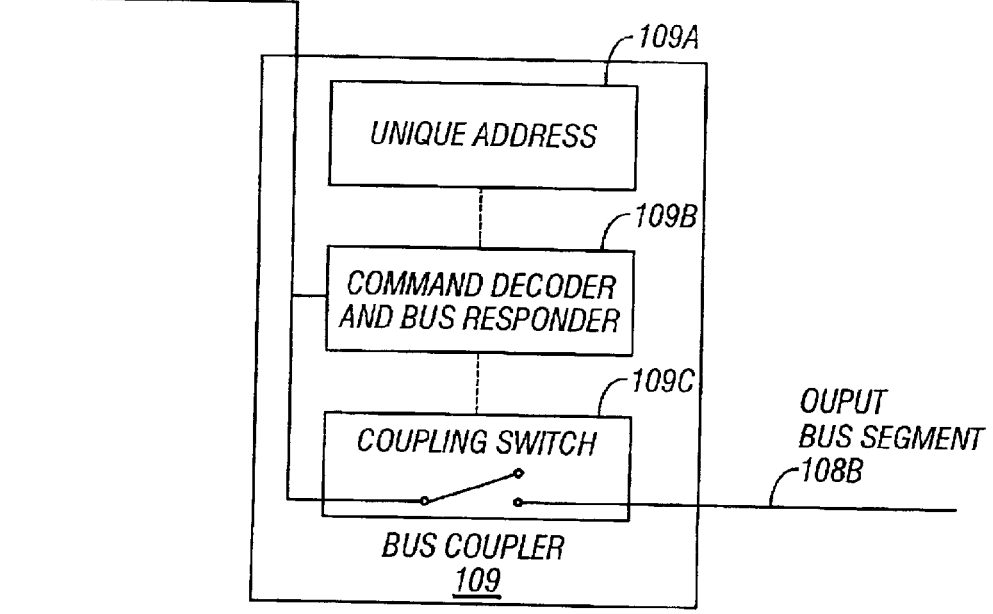
FIG. 1B is a block diagram of a bus-coupler used according to one aspect of the present invention.

FIG. 1B shows a block diagram of a bus-coupler (for illustration purpose, C1 109) that is coupled to bus-master 105 via input bus segment 108A. Output bus segment 108B is coupled to bus-coupler C2 114. In this example, bus segment 108B becomes the input bus segment for bus-coupler C2 114.

Bus-coupler 109 includes the unique address 109A. A format 300 for the unique address 109A is provided in FIG. 2B. In one aspect, the address format 300 consists of an 8-bit family code, a 48-bit unique serial number and an 8-bit cyclic redundancy check data.

Bus-coupler 109 also includes a command decoder and bus responder ("CDBR") 109B that responds to a "Find First" and "Find Next" device command from bus-master 105 when input bus segment 108A is connected to bus-master 105. The devices (bus-couplers, switches, A/D converters, etc.) that are connected directly to bus-master 105 are said to be "visible" to the computer-executable process steps (or CPU 101). Devices connected to the output bus segment 108B of a bus-coupler are visible only if the bus-coupler is visible and the switch in the bus-coupler is turned on. The response from bus-coupler 109 to an address inquiry contains the unique address for bus-coupler 109.

CDBR 109B also executes a switch control command received from bus-master 105, if input bus segment 108A is connected to bus-master 105 and the command contains the unique bus-coupler 109 address. The command causes coupling switch 109C to be turned on or off.

In one aspect of the present invention, bus-master 105 also executes the process steps described below to discover the location of the connected devices.

FIG. 2A is a process flow diagram by which location of the various devices, for example, the devices shown in FIG. 1A may be discovered.

Turning in detail to FIG. 2A, in step S200, computer system 100 is powered up and the discovery process starts.

In step S201, the process discovers the unique identification of each connected device that is visible. When power is first applied, all bus-coupler switches are set to the open position, i.e., turned off. Therefore, with respect to FIG. 1A, in step S201, only devices C1 109, S1 110 and A1 111 will be visible. Every device has, for example, a 64-bit address field. FIG. 2B shows an example of data format 300 for device identification.

The software driver obtains the unique address by sending out "Find First device" and "Find Next Device" commands. The unique address may be stored in a table at RAM 102 or any other memory storage device (not shown). The discovery in step S201, provides bus-master 105 and CPU 101 with the unique address of the visible devices (for example, the bus-coupler C1 109, switch S1 110 and A/D converter A1 ill of FIG. 1) but not the location.

In step S202, the process determines, if more than one bus-coupler is visible to bus-master 105. If more than one bus-coupler is visible then the process moves to step S301, described below with respect to FIG. 3.

If only one bus-coupler is visible, then bus-master 105 knows that visible bus-coupler is the closest, in this example, it will be bus-coupler C1 109. In step S203, the process records the location of C1 109. In one aspect of the present invention, the location is recorded as a rank. An example of the rank is provided in table 301 of FIG. 2B. Table 301 may be a look up table (LUT). LUT 301 may be stored on bus-master 105 memory (not shown) or RAM 102, or any other memory storage device or space. Table 301 shows that bus-coupler C1 109 has a rank 1, which indicates that it is the closest bus-coupler to bus-master 105 on 1-Wire bus 105A. Addresses of bus-couplers entered in table 301 will be understood by the process to be "already discovered". The entry at the bottom of table 301 will be understood as being the address and position of the "most recently discovered" device.

In step S204 the process instructs bus-master 105 to send a command to the most recently discovered bus-coupler to turn on its switch. In the current example, this makes bus-coupler C2 114, switch S2 113 and A/D converter A2 112 visible.

In step S204A the process performs "Find First" and "Find Next" operations to determine which devices are now visible, and in this example, it finds that C1 109, S1 110, A1 111, C2 114, S2 113, and A2 112 are visible. By looking up C1 109 and C2 114 in table 301, the process determines that C1 109 is "previously discovered" and C2 114 is a "new bus-coupler". Bus-master 105 knows the location/address of C1 109 based on table 301 entries. Based on the foregoing commands and table 301 rank of C1 109, bus-master 105 knows that C2 114 is next to C1 109. Hence, C2 114 is given a rank 2, which is also stored in table 301.

In step S205, the process determines if all bus-couplers have been located, i.e., there are no "new bus-couplers". If all the bus-couplers have been located, then the process stops at step s206. If all the bus-couplers have not been located, the process step of S204 is repeated to ascertain the location (e.g., the location of bus-coupler C3 115).

The foregoing process steps are based on when bus-master 105 finds a single bus-coupler, e.g., upon power-up. The process steps discussed below, allow CPU 101 to ascertain device locations, if more than one bus-coupler is visible to bus-master 105 (and hence to CPU 101). This may be required, during "hot-swapping", where a program starts without power up.

Figure 3:
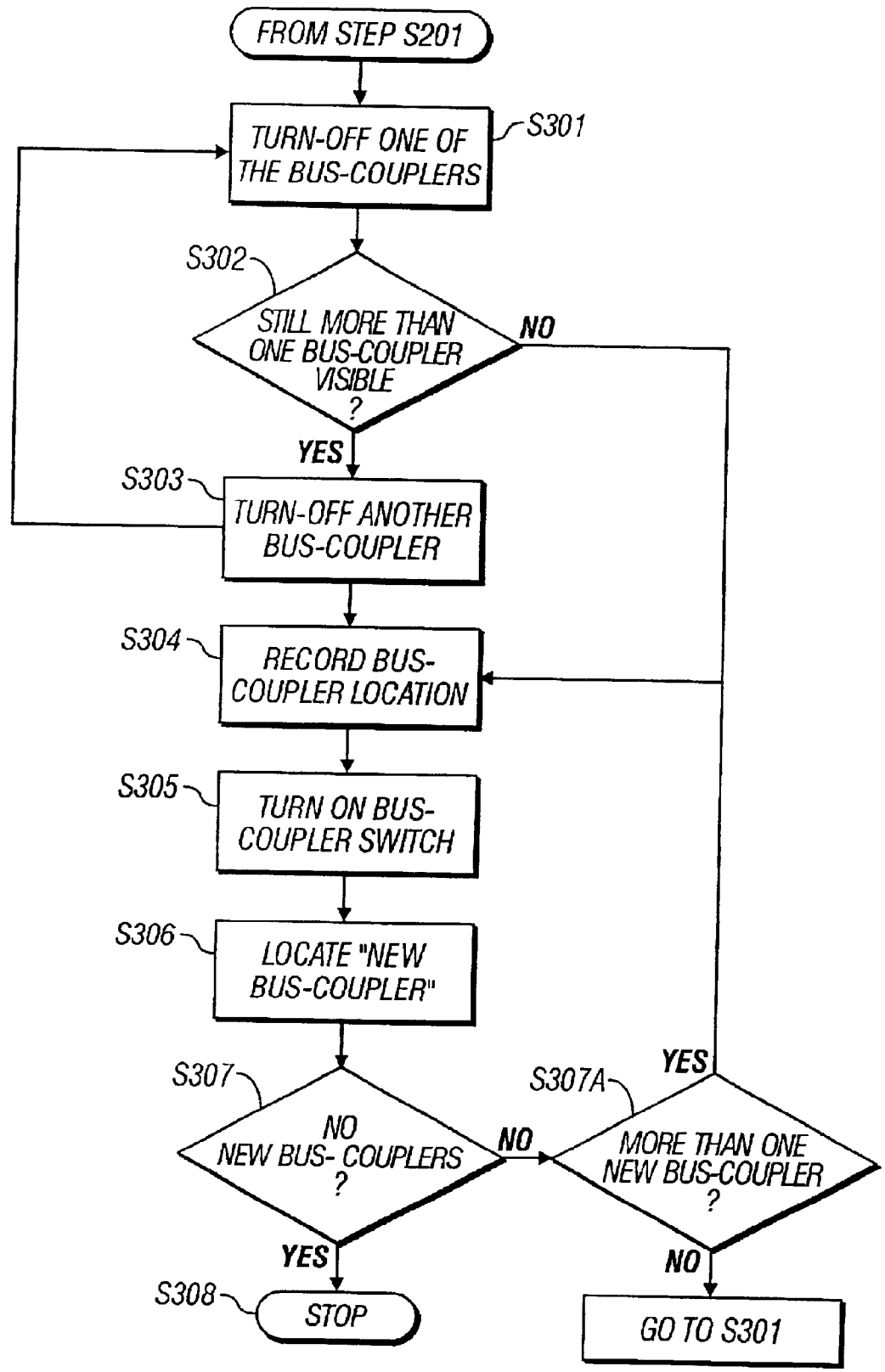
FIG. 3 is a flow diagram of computer-executable process steps for discovering the location of devices operationally coupled with a 1-Wire bus, without power-up, according to one aspect of the present invention.

FIG. 3 shows a flow diagram of process steps for discovering the location of devices attached to a 1-Wire bus when a computing system finds more than one bus-coupler.

Turning in detail to FIG. 3, in step S301, the process arbitrarily turns off a bus-coupler. For illustration sake, if bus-couplers C1 109 and C2 114 are visible when the process begins, bus-master 105 turns off, for example, C2 114. However, C2 114 must have been off or else C3 115 would also have been visible. Hence after turning off C2 114, the process in step S302 determines if there is still more than one bus-coupler visible. In this example, the answer to that is yes, and in step S303, the process turns off another bus-coupler, and in this case it would be bus-coupler C1 109 since it is the only other visible bus-coupler.

If in step S302 only one bus-coupler was visible after turning off the bus-coupler in step S301, then the process moves to step S304. In this example, this will occur if bus-coupler C1 109 was turned off in step S301. Otherwise the process repeats from step S301, turning off an additional visible bus-coupler.

In step S304, the process records the location of the only visible bus-coupler, similar to step S203 of FIG. 2A. In this case, bus-master 105 will record the location of C1 109, as being the nearest bus-coupler with L1 rank 1.

In step S305, bus-master 105 turns on the "most recently discovered" bus-coupler. In this example, it will be at C1 109.

In step S306, the process again uses the "Find First" and "Find Next" commands to determine the number of visible "new bus-couplers". If the number is zero (step S307), the process stops at step S308. If there is exactly one new bus-coupler visible (step S307A), then the process repeats from step S304. If more than one new bus-coupler is visible, the process repeats from step S301.

It is noteworthy that bus-master 105 run program builds an address/location table 301 for switch and A/D converters. These tables are build at the same time as the bus-coupler table because when only one bus-coupler is visible, only one new switch and one new A/D converter are also visible. It is noteworthy that the invention is not limited to having separate LUTs for every device. LUT 301 may include address/location of all the devices.

The process steps of FIG. 3 may also be used to locate individual circuits having bus-couplers because the location of the bus-couplers also provides the location of the circuit. One such circuit arrangement is shown in FIG. 4.

Figure 4:
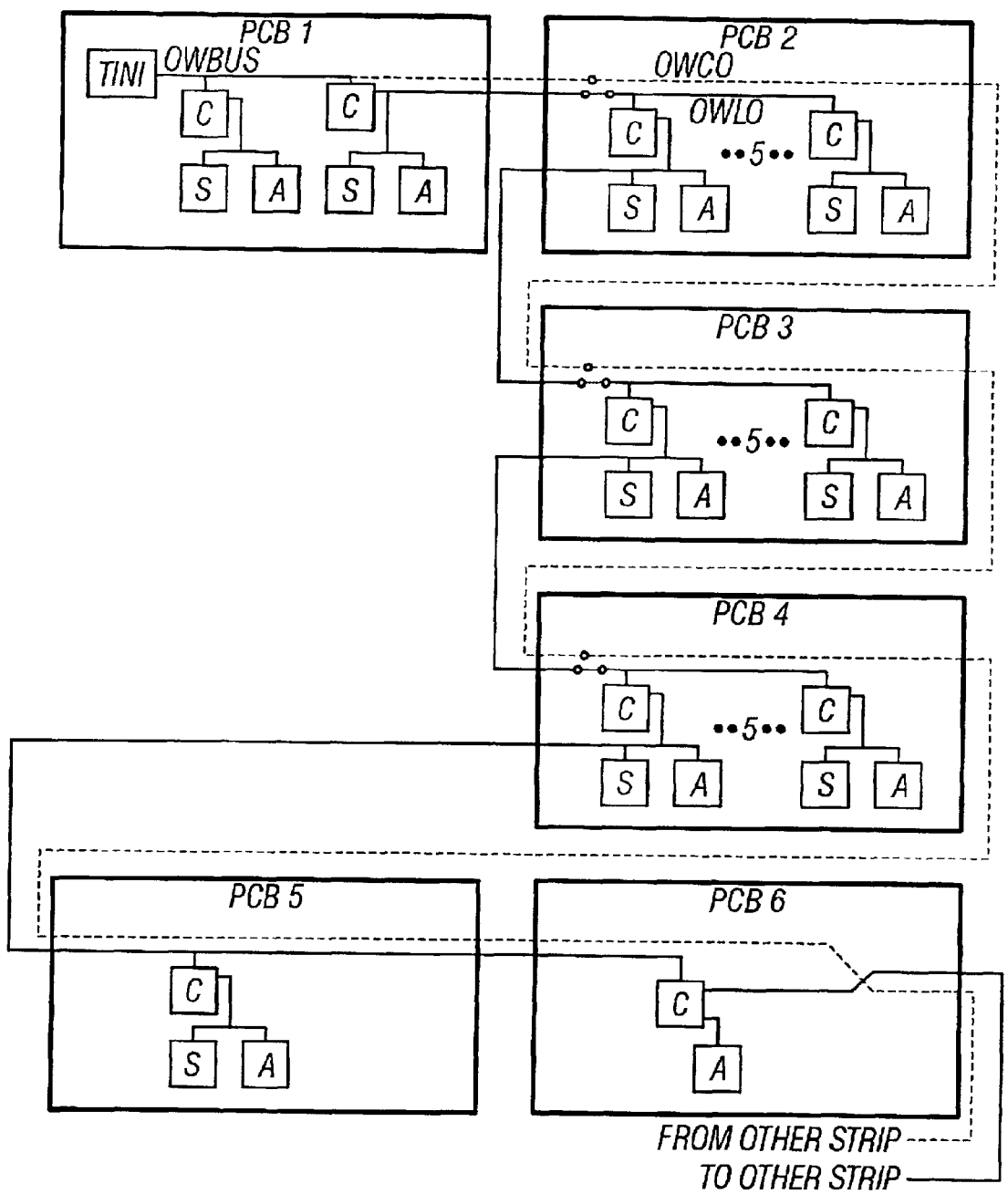
FIG. 4 is a block diagram showing various circuit boards with bus-couplers, switches and A/D converters, operationally coupled over a 1-Wire bus.

FIG. 4 shows a block diagram in which computer system 100 (or an embedded processor) are coupled to various integrated circuits having bus-couplers, switches and A/D converters operationally coupled using the 1-Wire bus. Similar to the FIG. 1 block diagram, the squares marked "C" represent bus couplers, those marked "S" represent switches, and those marked "A" represent A/D converters.

Printed Circuit Boards ("PCB") 1 through 6 include various bus-couplers, switches and A/D modules. FIG. 4 shows two busses that are used in parallel. The one labeled OWCO may be connected either as a return bus from another strip or as a single bus that can connect devices in two strips. It is noteworthy that the FIG. 3 process steps may be used to locate PCBs 1 through 6.

In one aspect of the present invention, individual tagging is not required to ascertain the location of devices that are operationally coupled to a computing system via a 1-Wire bus.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for determining the location of plural devices operationally coupled to a computer system using a 1-Wire bus, comprising:

determining if more than one bus-coupler is detected by the computer system;

disconnecting bus-couplers in an arbitrary manner until a pre-determined number of bus-coupler(s) is visible to the computing system;

determining the location of the detected pre-determined number of bus-couplers;

storing the location of the detected pre-determined number of bus-couplers; and repeating the foregoing steps until all the bus-coupler locations are determined and stored.

2. The method of claim 1, wherein the pre-determined number of bus-couplers is one.

3. The method of claim 1, wherein the plural devices include switches.

4. The method of claim 1, wherein the plural devices include analog to digital converters.

5. A system for determining the location of plural devices operationally coupled to a computer system using a 1-Wire bus, comprising:

means for determining if more than one bus-coupler is detected by the computer system;

means for disconnecting bus-couplers in an arbitrary manner until a pre-determined number of bus-coupler (s) is visible to the computing system;

means for determining the location of the detected pre-determined number of bus-couplers;

means for storing the location of the detected pre-determined number of bus-couplers; and means for repeating the foregoing steps until all the bus-coupler locations are determined and stored.

6. The system of claim 5, wherein the pre-determined number of bus-couplers is one.

7. The system of claim 5, wherein the plural devices include switches.

8. The system of claim 5, wherein the plural devices include analog to digital converters.

9. A computer-readable medium storing computer-executable process steps of a process for determining the location of plural devices operationally coupled to a computer system using a 1-Wire bus, comprising:

determining if more than one bus-coupler is detected by the computer system;

disconnecting bus-couplers in an arbitrary manner until a pre-determined number of bus-coupler's) is visible to the computing system;

determining the location of the detected pre-determined number of bus-couplers;

storing the location of the detected pre-determined number of bus-couplers; and repeating the foregoing steps until all the bus-coupler locations are determined and stored.

10. The computer-readable medium of claim 9, wherein the pre-determined number of bus-couplers is one.

11. The computer medium of claim 9, wherein the plural devices include switches.

12. The computer-readable medium of claim 9, wherein the plural devices include analog to digital converters.

13. Computer-executable process steps for determining the location of plural devices operationally coupled to a computer system using a 1-Wire bus, comprising:

determining if more than one bus-coupler is detected by the computer system;

disconnecting bus-couplers in an arbitrary manner until a pre-determined number of bus-coupler(s) is visible to the computing system;

determining the location of the detected pre-determined number of bus-couplers;

storing the location of the detected pre-determined number of bus-couplers; and repeating the foregoing steps until all the bus-coupler locations are determined and stored.

14. Computer-executable process steps of claim 13, wherein the pre-determined number of bus-couplers is one.

15. Computer-executable process steps of claim 13, wherein the plural devices include switches.

16. Computer-executable process steps of claim 13, wherein the plural devices include analog to digital converters.

* * * * *